US010654992B2

(12) United States Patent
Xue et al.

(10) Patent No.: US 10,654,992 B2
(45) Date of Patent: May 19, 2020

(54) RUBBER COMPOSITION COMPRISING SILICONE OIL

(71) Applicants: Boyong Xue, Shanghai (CN); Michael Edward Dotson, Tokyo (JP)

(72) Inventors: Boyong Xue, Shanghai (CN); Michael Edward Dotson, Tokyo (JP)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 288 days.

(21) Appl. No.: 15/328,677

(22) PCT Filed: Aug. 28, 2015

(86) PCT No.: PCT/JP2015/075146
§ 371 (c)(1),
(2) Date: Jan. 24, 2017

(87) PCT Pub. No.: WO2016/032010
PCT Pub. Date: Mar. 3, 2016

(65) Prior Publication Data
US 2017/0210885 A1    Jul. 27, 2017

(30) Foreign Application Priority Data

Aug. 29, 2014  (WO) .................. PCT/JP2014/073412

(51) Int. Cl.
B60C 1/00      (2006.01)
C08K 3/04      (2006.01)
C08K 3/36      (2006.01)
C08L 9/06      (2006.01)
C08K 9/04      (2006.01)
C08K 5/5415    (2006.01)
C08G 77/28     (2006.01)

(52) U.S. Cl.
CPC ............ C08K 9/04 (2013.01); B60C 1/00 (2013.01); B60C 1/0016 (2013.01); C08K 3/04 (2013.01); C08K 3/36 (2013.01); C08K 5/5415 (2013.01); C08L 9/06 (2013.01); C08G 77/28 (2013.01); C08K 2201/019 (2013.01); C08L 2205/025 (2013.01); C08L 2205/03 (2013.01)

(58) Field of Classification Search
CPC ...... C08L 7/00; C08L 9/00; C08L 9/06; C08L 2205/025; C08L 2205/03; C08G 77/28; C08K 2201/019; C08K 3/04; C08K 3/36; C08K 9/04; B60C 1/00; B60C 1/0016
See application file for complete search history.

(56) References Cited

U.S. PATENT DOCUMENTS 5,534,599 A  *  7/1996  Sandstrom ............ B60C 1/0016
                                                  525/342
5,550,200 A  *  8/1996  Shibata ................. C08F 236/10
                                                  525/342
6,774,255 B1     8/2004  Tardivat et al.
6,849,754 B2     2/2005  Deschler et al.
7,122,590 B2    10/2006  Cruse et al.
7,217,751 B2     5/2007  Durel et al.
7,250,463 B2     7/2007  Durel et al.
7,300,970 B2    11/2007  Durel et al.
7,335,692 B2     2/2008  Vasseur et al.
7,488,768 B2     2/2009  Tardivat et al.
7,491,767 B2     2/2009  Durel et al.
7,510,670 B2     3/2009  Chaves et al.
7,825,183 B2    11/2010  Robert et al.
7,834,074 B2    11/2010  Brunelet et al.
7,882,874 B2     2/2011  Robert et al.
8,324,310 B2    12/2012  Robert et al.
8,492,475 B2     7/2013  Araujo Da Silva et al.
9,010,393 B2     4/2015  Araujo Da Silva et al.
9,290,520 B2     3/2016  Cruse et al.
2002/0055564 A1  5/2002  Cruse et al.
2003/0236333 A1* 12/2003 Rawlinson ........... C08K 5/0016
                                                  524/306
2004/0010085 A1*  1/2004 Hall ....................... C08C 19/44
                                                  525/192
2004/0051210 A1  3/2004  Tardivat et al.
2004/0127617 A1  7/2004  Vasseur et al.
2004/0132880 A1  7/2004  Durel et al.
2005/0004297 A1  1/2005  Durel et al.
2005/0016650 A1  1/2005  Durel et al.
2005/0016651 A1  1/2005  Durel et al.
2005/0065264 A1*  3/2005 Pazur .................... B82Y 30/00
                                                  524/445
2006/0041063 A1  2/2006  Cruse et al.
2007/0228322 A1  10/2007 Chaves et al.
2008/0009564 A1  1/2008  Robert et al.
2008/0156404 A1  7/2008  Brunelet et al.
2009/0186961 A1  7/2009  Araujo Da Silva et al.
2009/0209709 A1  8/2009  Araujo Da Silva et al.
2009/0234066 A1  9/2009  Araujo Da Silva et al.
2009/0292063 A1  11/2009 Robert et al.
2010/0204359 A1  8/2010  Robert et al.
2011/0152458 A1  6/2011  Araujo Da Silva et al.
2013/0280459 A1  10/2013 Nakashima et al. ......... 428/36.8
2014/0243448 A1  8/2014  Lesage et al.
2018/0171055 A1*  6/2018 Kushner ............... C08F 257/02

FOREIGN PATENT DOCUMENTS

CN       103380173 A    10/2013
CN       103987773 A    8/2014
(Continued)

OTHER PUBLICATIONS

Machine translation of JP H10-176081 downloaded Sep. 12, 2018.*
(Continued)

Primary Examiner — Irina S Zemel
Assistant Examiner — Jeffrey S Lenihan
(74) Attorney, Agent, or Firm — Venable LLP

(57) ABSTRACT

The invention provides a rubber composition comprising at least a diene elastomer, at least 60 phr of a reinforcing inorganic filler, and 20 to 100 phr of a plasticizer comprising more than 4 phr of a mercapto-modified silicone oil.

13 Claims, No Drawings

(56) References Cited

FOREIGN PATENT DOCUMENTS

| | | |
|---|---|---|
| EP | 2 660 285 A1 | 11/2013 |
| JP | 6-73234 A | 3/1994 |
| JP | 10-176081 A | 6/1998 |
| JP | 2012-149222 | 8/2012 |
| WO | 96/37547 A2 | 11/1996 |
| WO | 99/09036 A1 | 2/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/002648 A1 | 1/2003 |
| WO | 03/002649 A1 | 1/2003 |
| WO | 03/016387 A1 | 2/2003 |
| WO | 2005/087859 A1 | 9/2005 |
| WO | 2006/023815 A2 | 3/2006 |
| WO | 2006/061064 A1 | 6/2006 |
| WO | 2006/125532 A1 | 11/2006 |
| WO | 2006/125533 A1 | 11/2006 |
| WO | 2006/125534 A1 | 11/2006 |
| WO | 2007/017060 A1 | 2/2007 |
| WO | 2007/098080 A2 | 8/2007 |
| WO | 2012/090941 A1 | 7/2012 |

OTHER PUBLICATIONS

International Search Report dated Nov. 18, 2015, issued by JPO in connection with International Application No. PCT/JP2015/075146.
Y. Bomal, et al., "Study on white carbon black used to reduce rolling resistance of tire", pp. 358-363 (2002) with English abstract.
R. Mildenburg, et al., Hydrocarbon Resins, VCH, New York, "Rubber Tires and Mechanical Rubber Goods", chapter 5.5, pp. 141-146 (1997).

* cited by examiner

RUBBER COMPOSITION COMPRISING SILICONE OIL

1. FIELD OF THE INVENTION

The invention relates to rubber compositions which can be used in particular as treads of tires, said compositions being intended to reduce the rolling resistance and to improve the wear resistance of the tires.

2. BACKGROUND

As is known, a tire tread has to meet a large number of often conflicting technical requirements, including a low rolling resistance, a high wear resistance, and a high grip on both the dry road and the wet road.

This compromise in properties, in particular from the viewpoint of the rolling resistance and the wear resistance, has been improved in recent years with regard to energy-saving "Green Tires", intended in particular for passenger vehicles, by virtue in particular of the use of novel low hysteresis rubber compositions having the feature of being reinforced predominantly by specific inorganic fillers, described as reinforcing fillers, in particular by highly dispersible silicas (HDSs), capable of rivaling, from the view point of reinforcing power, conventional tire-grade carbon blacks.

Further improvements of the rolling resistance and/or the wear resistance remain however a constant concern of the tire designers.

3. BRIEF DESCRIPTION OF THE INVENTION

By continuing their research, the inventors have discovered a novel and specific rubber composition that comprise at least diene elastomer, a reinforcing inorganic filler and a specific plasticizer comprising a mercapto-modified silicone oil, which makes it possible to decrease the rolling resistance, and to enhance the wear resistance of these tires having treads comprising this rubber composition.

Thus, a first subject-matter of the invention is a rubber composition comprising at least, a diene elastomer, at least 60 phr of a reinforcing inorganic filler, 20 to 100 phr of a plasticizer comprising more than 4 phr of a mercapto-modified silicone oil.

Moreover, Aspects of the Present Invention can be as Follows.

[1] A rubber composition comprising at least:
a diene elastomer;
at least 60 phr of a reinforcing inorganic filler;
20 to 100 phr of a plasticizer comprising more than 4 phr of a mercapto-modified silicone oil.

[2] The rubber composition according to [1], wherein the reinforcing inorganic filler is silica.

[3] The rubber composition according to [1] or [2], wherein the content of the mercapto-modified silicone oil is from 5 to 35 phr.

[4] The rubber composition according to any one of [1] to [3], wherein the mercapto-modified silicone oil bears at least two mercapto functions per molecule.

[5] The rubber composition according to any one of [1] to [4], wherein the functional type of the mercapto-modified silicone oil is a α, ω difunctional type.

[6] The rubber composition according to any one of [1] to [5], wherein the content of the reinforcing inorganic filler is more than 70 phr and less than 120 phr.

[7] The rubber composition according to any one of [1] to [6], wherein the diene elastomer is chosen from the group consisting of natural rubber, synthetic polyisoprenes, polybutadienes, butadiene copolymers, isoprene copolymers and the mixtures thereof.

[8] The rubber composition according to any one of [1] to [7], wherein the rubber composition comprises 50 to 100 phr of a copolymer based on styrene and butadiene, and 0 to 50 phr of another optional diene elastomer.

[9] The rubber composition according to [8], wherein the copolymer based on styrene and butadiene is chosen from the group consisting of styrene-butadiene copolymers, styrene-butadiene-isoprene copolymers and the mixtures thereof.

[10] The rubber composition according to [8], wherein the copolymer based on styrene and butadiene is a styrene-butadiene copolymer (SBR).

[11] The rubber composition according to any one of [8] to [10], wherein the copolymer based on styrene and butadiene has a glass transition temperature at greater than −40° C.

[12] The rubber composition according to [11], wherein the copolymer based on styrene and butadiene has a glass transition temperature within a range from −30° C. to +30° C.

[13] The rubber composition according to [8] to [12], wherein the other optional diene elastomer is chosen from the group consisting of natural rubber, synthetic polyisoprenes, polybutadienes, isoprene copolymers, and mixtures thereof.

[14] The rubber composition according to any one of [1] to [13], wherein the rubber composition further comprises between 0.2 and 20 phr of carbon black.

[15] The rubber composition according to any one of [1] to [14], wherein the plasticizer further comprises a compound selected from the group consisting of liquid plasticizers other than the mercapto-modified silicone oil, hydrocarbon resins and the mixtures thereof.

[16] The rubber composition according to [15], wherein the liquid plasticizers are chosen from the group consisting of polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof.

[17] The rubber composition according to [15], wherein the hydrocarbon resins are chosen from the group consisting of cyclopentadiene homopolymer or copolymer resins, dicyclopentadiene homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins, and the mixtures of these resins.

[18] The rubber composition according to any one of [1] to [17], wherein the content of the plasticizer is from 20 to 80 phr.

[19] A process of manufacturing the rubber composition according to any one of [1] to [18], comprising at least the steps of:
incorporating in at least the diene elastomer, into a mixer, at least 60 phr of a reinforcing inorganic filler, during a first stage, everything being kneaded thermomechnically, in thermomechanically, in one or more goes, until a maximum temperature of between 130° C. and 200° C. is reached;

cooling the combined mixture to a temperature of less than less than 100° C.;

subsequently incorporating, during a second stage, a crosslinking system;

kneading everything up to a maximum temperature of less than 120° C.;

extruding or calendering the rubber composition, wherein a plasticizer comprising a mercapto-modified silicone oil is incorporated either during the first stage or during the second stage, or both of the first and second stages so that the total weight of the plasticizer is from 20 to 100 phr and the mercapto-modified silicone oil is more than 4 phr.

[20] The process according to [19], wherein the mercapto-modified silicone oil is incorporated partially or totally during the second stage.

[21] The process according to [19] or [20], wherein the crosslinking system comprises less than 2 phr of zinc oxide.

[22] The process according to [21], wherein the crosslinking system is devoid of zinc oxide.

[23] Use of a composition in accordance with any one of [1] to [18] for the manufacture of treads for pneumatic tires.

[24] A tread for a pneumatic tire comprising the composition according to any one of [1] to [18].

[25] A pneumatic tire comprising the tread according to [24].

The tires of the invention are particularly intended to equip passenger motor vehicles, including 4×4 (four-wheel drive) vehicles and SUV (Sport Utility Vehicles) vehicles, two-wheel vehicles (in particular motorcycles), and also industrial vehicles in particular chosen from vans and heavy-duty vehicles (i.e., underground, bus or heavy road transport vehicles (lorries, tractors, trailers)), or off-road vehicles, such as agricultural vehicles or earthmoving equipment.

The invention and its advantages will be easily understood in the light of the description and implementation examples which follow.

4. MEASUREMENTS AND TESTS USED

The rubber compositions according to the present invention including examples are characterized and tested after curing, as indicated below.

4-1. Shore A Hardness

The Shore A hardness of the compositions after curing is assessed in accordance with Standard ASTM D 2240-86.

4-2. Tensile Tests

These tensile tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after a cycle of accommodation to the degree of extension expected for the measurement itself) at 10% elongation (denoted by M10), 100% elongation (M100) and 300% elongation (M300). All these tensile measurements are carried out under the standard conditions of temperature (23±2° C.) and hygrometry (50±5% relative humidity), according to French Standard NF T 40-101 (December 1979).

4-3. Dynamic Properties

The dynamic properties are measured on a viscosity analyser (Metravib VA4000), according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, is recorded. A strain amplitude sweep is carried out from 0.1% to 50% (outward cycle) and then from 50% to 1% (return cycle). The result made use of is the loss factor tan($\delta$). The maximum value of tan($\delta$) observed, denoted tan($\delta$)$_{max}$, at 23° C., is shown for the return cycle. It should be remembered that, in a way well known to a person skilled in the art, the value of tan($\delta$)$_{max}$ at 23° C. is representative of the hysteresis of the material and thus of the rolling resistance: the lower the value of tan($\delta$)$_{max}$ at 23° C., the lower the rolling resistance.

5. DETAILED DESCRIPTION OF THE INVENTION

The abbreviation "phr" means parts by weight per 100 parts of elastomer. In the present description, unless expressly indicated otherwise, all the percentages (%) shown are % by weight. Moreover, any interval of values denoted by the expression "between a and b" represents the range of values extending from greater than a to less than b (that is to say, limits a and b excluded) whereas any interval of values denoted by the expression "from a to b" means the range of values extending from a up to b (that is to say, including the strict limits a and b).

5-1. Diene Elastomer

The rubber composition according to the present invention has a first essential feature of comprising a diene elastomer.

It should be remembered that "diene" elastomer or rubber should be understood as meaning an elastomer resulting at least in part (i.e., a homopolymer or a copolymer) from diene monomers (monomers carrying two carbon-carbon double bonds which may or may not be conjugated).

Diene elastomers can be classified in a known way into two categories: those "essentially unsaturated" and those "essentially saturated". Butyl rubbers, such as, for example copolymers of dienes and of $\alpha$-olefins of EPDM type, come within the category of essentially saturated diene elastomers, having a content of units of diene origin which is low or very low, always less than 15% (mol %). In contrast, essentially unsaturated diene elastomer is understood to mean a diene elastomer resulting at least in part from conjugated diene monomers, having a content of units of diene origin (conjugated dienes) which is greater than 15% (mol %). In the category of "essentially unsaturated" diene elastomers, "highly unsaturated" diene elastomer is understood to mean in particular a diene elastomer having a content of units of diene origin (conjugated dienes) which is greater than 50%.

It is preferable to use at least one diene elastomer of the highly unsaturated type, in particular a diene elastomer chosen from the group consisting of polybutadienes (BR), synthetic polyisoprenes (IR), natural rubber (NR), butadiene copolymers, isoprene copolymers and mixtures of these elastomers. Such copolymers are more preferably chosen from the group consisting of butadiene/styrene copolymers (SBR), isoprene/butadiene copolymers (BIR), isoprene/styrene copolymers (SIR), isoprene/butadiene/styrene copolymers (SBIR) and mixtures of such copolymers.

More preferably, the rubber composition of the present invention comprises, as the diene elastomer, from 50 to 100 phr of a copolymer based on styrene and on butadiene, that is to say a copolymer of at least one styrene monomer and of at least one butadiene monomer; in other words, said copolymer based on styrene and on butadiene comprises, by definition, at least units derived from styrene and units derived from butadiene.

Suitable butadiene monomers are in particular 1,3-butadiene, 2-methyl-1,3-butadiene, 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene or 2-methyl-3-isopropyl-1,3-butadiene and an aryl-1,3-butadiene. Suitable styrene monomers are in particular styrene, methyl styrenes, para-(tert-butyl)styrene, methoxystyrenes and chlorostyrenes.

Said copolymer based on styrene and on butadiene may have any microstructure, which is a function of the polymerization conditions used, in particular of the presence or absence of a modifying and/or randomizing agent and of the amounts of modifying or randomizing agents used. It may be, for example, a block, statistical, sequential or microsequential copolymer, and may be prepared in dispersion or in solution; it may be coupled and/or star-branched or else functionalized with a coupling and/or star-branching or functionalizing agent.

Preferably, the copolymer based on styrene and on butadiene is chosen from the group consisting of styrene-butadiene (abbreviated to SBR) copolymers, styrene-butadiene-isoprene (abbreviated to SBIR) copolymers and blends of such copolymers.

Among the SBIR copolymers, mention may especially be made of those having a styrene content between 5% and 50% by weight and more particularly between 10% and 40%, an isoprene content between 15% and 60% by weight and more particularly between 20% and 50%, a butadiene content between 5% and 50% by weight and more particularly between 20% and 40%, a content (mol %) of 1,2-units of the butadiene part of between 4% and 85%, a content (mol %) of trans-1,4-units of the butadiene part of between 6% and 80%, a content (mol %) of 1,2-units plus 3,4-units of the isoprene part of between 5% and 70% and a content (mol %) of trans-1,4-units of the isoprene part of between 10% and 50%.

More preferably, an SBR copolymer is used. Among the SBR copolymers, mention may especially be made of those having a styrene content of between 5% and 60% by weight and more particularly of between 20% and 50%, a content (mol %) of 1,2-bonds of the butadiene part of between 4% and 75% and a content (mol %) of trans-1,4-bonds of between 10% and 80%.

The Tg (glass transition temperature) of copolymer based on styrene and on butadiene is preferably greater than −40° C., more preferably greater than −35° C., particularly within a range from −30° C. to +30° C., more particularly within a range from −25° C. to +25° C.

The Tg of the elastomers described here is measured in a conventional manner, well known to a person skilled in the art, on an elastomer in the dry state (i.e. without extender oil) and by DSC (Differential Scanning calorimetry) (for example according to ASTM D3418 (1999)).

A person skilled in the art knows how to modify the microstructure of a copolymer based on styrene and on butadiene, in particular of an SBR, in order to increase and adjust its Tg, especially by playing with the contents of styrene, of 1,2-bonds or else of trans-1,4-bonds of the butadiene part. Use is more preferably made of an SBR (solution or emulsion) having a styrene content (mol %) which is greater than 35%, more particularly between 35% and 60%, in particular within a range from 38% to 50%. SBRs having a relatively high Tg are well known to a person skilled in the art; they have been used in particular in tire treads for improving some of their standard properties.

With the preferable copolymer based on styrene and on butadiene described above, at least another optional (or second) diene elastomer, optional and different from said copolymer (i.e. not comprising units derived from styrene and butadiene) may be combined, said second diene elastomer being present in a weight content which is consequently at most equal to 50 phr in case of that content of copolymer based on styrene and on butadiene is at least equal to 50 phr. That means content of the other diene elastomer(s) is 100 phr minus that of copolymer based on styrene and on butadiene.

This optional second diene elastomer is preferably chosen from the group consisting of natural rubbers (NR), synthetic polyisoprenes (IR), polybutadienes (BR), isoprene copolymers and blends of these elastomers. Such copolymers are more preferably chosen from the group consisting of isoprene-butadiene copolymers (BIR) and isoprene-styrene copolymers (SIR).

Especially suitable, among the latter, are polybutadiene (BR) homopolymers and in particular those having a content (mol %) of 1,2-units of between 4% and 80% or those having a content (mol %) of cis-1,4-units of greater than 80%; polyisoprene (IR) homopolymers; butadiene-isoprene copolymers (BIR) and especially those having an isoprene content of between 5% and 90% by weight and a Tg from −40° C. to −80° C.; and isoprene-styrene copolymers (SIR) and especially those having a styrene content of between 5% and 50% by weight and a Tg of between −25° C. and −50° C.

According to one preferred embodiment, the second diene elastomer is an isoprene elastomer, more preferably natural rubber or a synthetic polyisoprene of cis-1,4-type; among these synthetic polyisoprenes, use is preferably made of polyisoprenes having a content (mol %) of cis-1,4-bonds of greater than 90%, more preferably still of greater than 98%.

According to another more preferred embodiment, the second diene elastomer is a polybutadiene, preferably a polybutadiene having a content (mol %) of cis-1,4 bonds of greater than 90%.

According to another more preferred embodiment, the second diene elastomer is a mixture of polybutadiene with the following isoprene elastomer (natural rubber or synthetic polyisoprene).

5-2. Reinforcing Inorganic Filler

As another essential feature, the rubber composition according to the invention comprises a reinforcing inorganic filler in a specific amount, in a proportion of at least 60 phr.

The expression "reinforcing inorganic filler" should be understood here to mean any inorganic or mineral filler, whatever its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

Mineral fillers of the siliceous type, preferably silica ($SiO_2$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 $m^2/g$, preferably from 30 to 400 $m^2/g$, in particular between 60 and 300 $m^2/g$. Mention will be made, as highly dispersible precipitated silicas ("HDSs"), for example, of the "Ultrasil 7000" and "Ultrasil 7005" silicas from Evonik, the "Zeosil 1165 MP", "1135 MP" and "1115 MP" silicas from Rhodia, the "Hi-Sil EZ150G" silica from PPG, the "Zeopol" 8715, 8745 and 8755 silicas from Huber or the silicas with a high specific surface area as described in application WO 03/16387.

Mention will also be made, as reinforcing inorganic filler, of mineral fillers of the aluminous type, in particular alumina ($Al_2O_3$) or aluminium (oxide) hydroxides, or else reinforcing titanium oxides.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made, for example, of carbon blacks for tires, such as described, for example, in patent documents WO 96/37547 and WO 99/28380.

Preferably, the content of reinforcing inorganic filler is in a range extending from 60 to 150 phr, more preferably between 70 and 120 phr, more still preferably from 75 to 100 phr, particularly from 80 to 90 phr.

According to one preferred embodiment of the invention, the reinforcing inorganic filler comprises from 50% to 100% by weight of silica. Preferably, the reinforcing inorganic filler is silica.

According to another preferred embodiment, the rubber composition in accordance with the invention may comprise carbon black. The carbon black, when it is present, is preferably used at a content of less than 20 phr, in particular of between 0.2 and 20 phr, more preferably between 1 and 15 phr, more still preferably of between 2 and 10 phr, particularly from 4 to 8 phr. In the ranges indicated, the colouring properties (black pigmenting agent) and UV-stabilizing properties of the carbon blacks are benefited from, without, moreover, adversely affecting the typical performances provided by the reinforcing inorganic filler.

In order to couple the reinforcing inorganic filler to the diene elastomer, use is made, in a known manner, of a coupling agent (or bonding agent) intended to provide a satisfactory connection, of chemical and/or physical nature, between the inorganic filler (surface of its particles) and the diene elastomer. This coupling agent is at least bifunctional. Use is made in particular of at least bifunctional organosilanes or polyorganosiloxanes.

Use is made in particular of silane polysulphides, referred to as "symmetrical" or "asymmetrical" depending on their particular structure, as described, for example, in applications WO 03/002648 (or US 2005/016651) and WO 03/002649 (or US 2005/016650).

Particularly suitable, without the definition below being limiting, are silane to polysulphides corresponding to the following general formula (I):

Z-A-$S_x$-A-Z, in which: (I)

Z-A-$S_x$-A-Z, in which: (I)

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

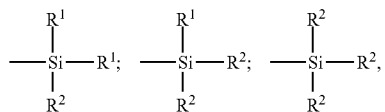

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl),
are suitable in particular, without the above definition being limiting.

In the case of a mixture of alkoxysilane polysulphides corresponding to the above formula (I), in particular the usual mixtures available commercially, the mean value of the "x" index is a fractional number preferably of between 2 and 5, more preferably in the vicinity of 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$) alkoxyl di($C_1$-$C_4$)alkyl silylpropyl)polysulphides (in particular disulphides, trisulphides or tetrasulphides), more particularly bis(monoethoxydimethylsilylpropyl)tetrasulphide, as described in Patent Application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in Patent Applications WO 02/30939 (or U.S. Pat. No. 6,774, 255) and WO 02/31041 (or US 2004/051210), or of silanes or POSs carrying azodicarbonyl functional groups, such as described, for example, in Patent Applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815 or WO 2007/098080.

Of course, use could also be made of mixtures of the coupling agents described previously, as described in particular in the aforementioned application WO 2006/125534.

In the rubber compositions in accordance with the present invention, the content of coupling agent is preferably between 2 and 15 phr, more preferably between 3 and 12 phr.

5-3. Plasticizing System

The rubber composition according to the present invention has the other essential characteristic of comprising 20 to 100 phr of a plasticizer comprising more than 4 phr of a mercapto-modified silicone oil.

The content of the (total) plasticizer is preferably from 20 to 80 phr and more preferably from 25 to 75 phr.

Regarding the content of the mercapto-modified silicone oil, the indicated minimum or less, the targeted technical effect is insufficient. Preferably, the content of the mercapto-modified silicone oil is between 4 and 40 phr, wherein the recommended maximum, there is an issue of cost of the mercapto-modified silicone oil and a risk of worsening processability. For these reasons, the content of the mercapto-modified silicone oil is more preferably from 5 to 35 phr, still more preferably between 7 and 30 phr, particularly from 10 to 25 phr, more particularly from 10 to 20 phr and still more particularly from 10 to 15 phr.

The mercapto-modified silicone oil means silicone or polymerized siloxanes bearing at least one mercapto (thiol: —SH) function per molecule. Preferably, the mercapto-modified silicone oil bears at least two mercapto functions per molecule.

According to a preferred embodiment, the functional type of the mercapto-modified silicone oil is chosen from the group consisting of side chain, end chain and dual-end that is $\alpha, \omega$ difunctional type. Preferably, the functional type is a $\alpha, \omega$ difunctional type.

The metcapto-modified silicone oil is well known and is available commercially, for example known as KF-2001, KF-2004, X-22-167B as provided by Shin-Etsu Chemical Co., Ltd.

Preferably, the plasticizer further comprises a compound selected from the group consisting of liquid plasticizers other than the mercapto-modified silicone oil, hydrocarbon resins and the mixture thereof.

The liquid plasticizers are liquid at 20° C. by definition, their role is to soften the matrix by diluting the elastomer and the reinforcing filler; their Tg is by definition less than −20° C., preferably less than −40° C.

Any extending oil, whether of aromatic or non-aromatic nature, any liquid plasticizing agent known for its plasticizing properties with regard to diene elastomers, can be used. At ambient temperature (20° C.), these plasticizers or these oils, which are more or less viscous, are liquids (that is to say, as a reminder, substances that have the ability to eventually take on the shape of their container), as opposed, in particular, to plasticizing hydrocarbon resins which are by nature solid at ambient temperature.

The liquid plasticizers chosen from the group consisting of polyolefinic oils, naphthenic oils (low or high viscosity, in particular hydrogenated or otherwise), paraffinic oils, DAE (Distillate Aromatic Extracts) oils, MES (Medium Extracted Solvates) oils, TDAE oils (Treated Distillate Aromatic Extracts), RAE oils (Residual Aromatic Extracts), TRAE oils (Treated Residual Aromatic Extracts), SRAE oils (Safety Residual Aromatic Extracts), mineral oils, vegetable oils, ether plasticizers, ester plasticizers, phosphate plasticizers, sulphonate plasticizers and the mixtures thereof are particularly suitable.

According to a preferred embodiment, the liquid plasticizers are chosen from the group consisting of MES oils, TDAE oils, naphthenic oils, vegetable oils and the mixtures thereof.

Mention may be made, as phosphate plasticizers for example, of those that contain between 12 and 30 carbon atoms, for example trioctyl phosphate. As examples of ester plasticizers, mention may especially be made of the compounds chosen from the group consisting of trimellitates, pyromellitates, phthalates, 1,2-cyclohexane dicarboxylates, adipates, azelates, sebacates, triesters of glycerol, and mixtures thereof. Among the above triesters, mention may be made of glycerol triesters, preferably composed predominantly (for more than 50% by weight, more preferably for more than 80% by weight) of an unsaturated $C_{18}$ fatty acid, that is to say an unsaturated fatty acid chosen from the group consisting of oleic acid, linoleic acid, linolenic acid and the mixtures thereof. More preferably, whether of synthetic origin or natural origin (in the case, for example, of sunflower or rapeseed vegetable oils), the fatty acid used is composed for more than 50% by weight, more preferably still from 80% by weight, of oleic acid. Such triesters (trioleates) comprising a high content of oleic acid are well known; for example they have been described in Application WO 02/088238, as plasticizing agents in treads for tires.

The hydrocarbon resins, which are solid plasticizers (at 20° C.), exhibit a Tg of greater than +20° C., preferably greater than +30° C., such as is described, for example in Applications WO 2005/087859, WO 2006/061064 and WO 2007/017060.

The hydrocarbon resins are polymers well known to a person skilled in the art which are essentially based on carbon and hydrogen and thus miscible by nature in diene elastomer composition(s), when they are additionally described as being "plasticizing". They have been described, for example, in the work entitled "Hydrocarbon Resins" by R. Mildenberg, M. Zander and G. Collin (New York, VCH, 1997, ISBN 3-527-28617-9), chapter 5 of which is devoted to their applications, in particular in the tire rubber field (5.5. "Rubber Tires and Mechanical Goods"). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say that they comprise only carbon and hydrogen atoms.

Preferably, the hydrocarbon resins as being "plasticizing" exhibit at least one, more preferably all, of the following characteristics:

a Tg of greater than 20° C. (more preferably between 40 and 100° C.;

a number-average molecular weight (Mn) of between 400 and 2000 g/mol (more preferably between 500 and 1500 g/mol);

a polydispersity index (PI) of less than 3, more preferably less than 2 (reminder: PI=Mw/Mn with Mw the weight-average molecular weight).

The Tg is measured in a known way by DSC (Differential Scanning calorimetry) according to Standard ASTM D3418 (1999). The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a particularly preferred embodiment, the hydrocarbon resins as being "plasticizing" are chosen from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those chosen from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methyl styrene, ortho-, meta- or para-methyl styrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

5-4. Various Additives

The rubber composition according to the present invention may comprise all or a portion of the usual additives generally used in the elastomer compositions intended for the manufacture of treads for tires, such as, for example, pigments, protection agents, such as antiozone waxes, chemical antiozonants, antioxidants, antifatigue agents, reinforcing resins, such as methylene acceptors (for example phenolic novolac resin) or methylene donors (for example HMT or H3M), a crosslinking system based either on sulphur or on donors of sulphur and/or peroxide and/or bismaleimides, vulcanization accelerators, or vulcanization activators.

The rubber composition can also comprise coupling activators when a coupling agent is used, agents for covering the inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

5-5. Manufacture of the Rubber Compositions and of the Treads

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated.

A process which can be used for the manufacture of such compositions comprises, for example and preferably, the following steps:

incorporating in the diene elastomer, in a mixer, at least 60 phr of the reinforcing inorganic filler, during a first stage ("non-productive" stage) everything being kneaded thermomechanically, in one or more goes, until a maximum temperature of between 130° C. and 200° C. is reached;

cooling the combined mixture to a temperature of less than 100° C.;

subsequently incorporating, during a second stage ("productive" stage), a crosslinking system;

kneading everything up to a maximum temperature of less than 120° C.;

extruding or calendering the rubber composition thus obtained, in particular in the form of a tire tread wherein the plasticizer comprising the mercapto-modified silicone oil is incorporated either during the first stage or during the second stage, or both of the first and second stages so that the total weight of the plasticizer is from 20 to 100 phr and the mercapto-modified silicone oil is more than 4 phr.

According to a preferable embodiment, the first (non-productive) stage is carried out in a single thermomechanical stage during which all the necessary constituents, the optional additional covering agents or processing aids, and various other additives, with the exception of the crosslinking system, are introduced into an appropriate mixer, such as a normal internal mixer. After cooling the mixture thus obtained during the first non-productive phase, the crosslinking system is then incorporated at low temperature, generally in an external mixer, such as an open mill; everything is then mixed (the second (productive) stage) for a few minutes, for example between 5 and 15 min.

According to a specific embodiment and combined with the above embodiment described here, the plasticizer comprising the mercapto-modified silicone oil is incorporated partially or totally during the second stage in addition to or instead of the first stage. In this connection, the mercapto-modified silicone oil may be incorporated into the mixer alone or in combination with the remaining plasticizer, which may be included in the essential plasticizer system of the invention (e.g., the compound selected from the group consisting of liquid plasticizer other than the mercapto-modified silicone oil, hydrocarbon resin and the mixture thereof). For example, the mercapto-modified silicone oil may be incorporated totally during the second stage, while the remaining plasticizer may be incorporated totally during the first stage, and vice versa. When the mercapto-modified silicone oil and the remaining plasticizer are incorporated into the mixer separately, it is preferable that the mercapto-modified silicone oil is incorporated partially or totally during the second stage in addition to or instead of the first stage and the remaining plasticizer is incorporated totally during the first stage.

The crosslinking system proper is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 3.0 phr, and that of the primary accelerator is preferably between 0.5 and 5.0 phr.

According to a specific preferred embodiment, the crosslinking system comprises less than 2 phr, more preferably less than 1.5 phr of zinc oxide. Still more preferably, the crosslinking system is devoid of zinc oxide.

Use may be made, as accelerator (primary or secondary) of any compound capable of acting as accelerator of the vulcanization of diene elastomers in the presence of sulphur, in particular accelerators of the thiazoles type and their derivatives, accelerators of thiurams types, or zinc dithiocarbamates. These accelerators are more preferably chosen from the group consisting of 2-mercaptobenzothiazyl disulphide (abbreviated to "MBTS"), N-cyclohexyl-2-benzothiazole-sulphenamide (abbreviated to "CBS"), N,N-dicyclohexyl-2-benzothiazolesulphenamide ("DCBS"), N-tert-butyl-2-benzothiazolesulphenamide ("TBBS"), N-tert-butyl-2-benzothiazolesulphenimide ("TBSI"), zinc dibenzyldithiocarbamate ("ZBEC"), tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as a part of a tire tread.

The vulcanization (or curing) is carried out in a known way at a temperature generally of between 130° C. and 200° C. for a sufficient time which can vary, for example, between 5 and 90 min depending in particular on the curing temperature, the vulcanization system adopted and the vulcanization kinetics of the composition under consideration.

The rubber compositions according to the invention can constitute all or a portion only of the tread in accordance with the invention, in the case of a tread of composite type formed from several rubber compositions of different formulations.

The invention relates to the rubber compositions and to the treads described above, both in the raw state (i.e., before curing) and in the cured state (i.e., after crosslinking or vulcanization).

Moreover, the rubber compositions according to the invention may constitute all or a portion only of sidewalls of tires, which may make it possible to decrease rolling resistance performance of the tires.

The invention is further illustrated by the following non-limiting examples.

6. EXAMPLES OF THE IMPLEMENTATION OF THE INVENTION

6-1. Preparation of the Rubber Compositions and of the Treads

The tests which follow were carried out in the following way: the reinforcing inorganic filler (in this example silica as reinforcing inorganic filler, its associated coupling agent), small amount of carbon black, the plasticizer, the diene elastomer (or blend of diene elastomers) and the various other ingredients, with the exception of the vulcanization system, are successively introduced into an internal mixer having an initial vessel temperature of approximately 60° C.; the mixer is thus approximately 70% full (% by volume). Thermomechanical working (non-productive phase) was then carried out in one stage, which lasts in total approximately 3 to 4 minutes, until a maximum "dropping" temperature of 165° C. is reached. The mixture thus obtained was recovered and cooled and then sulphur and an accelerator of sulphenamide type are incorporated on an external mixer (homofinisher) at 30° C., everything being mixed (productive phase) for an appropriate time (for example between 5 and 12 min). It should be remembered that Shore A Hardness and M10, which are indicators relative to the handling stability performance of a tire comprising a tread comprising each rubber composition, show different technical meanings to M100 and M300 relative to the wear resistance of the tire. Therefore, even though an example as a rubber composition according to the present invention has lower the indicators (M10 and Shore A hardness) than a comparative example as another rubber composition, this does not mean the former is worse than the latter in the present purpose.

The compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

6-2. Rubber Tests

Results shown in Table 2, 4 and 6 were obtained by methods of measurements and tests mentioned in "4. MEASUREMENTS AND TESTS USED" unless otherwise instructed.

6-2-1. Example 1

In this test, seven compositions (identified as C-1, C-2, C-3, C-4, C-5, C-6 and C-7) based on diene elastomers (BR and SBR blend) are compared, the five compositions are reinforced with a blend of silica (as a reinforcing inorganic filler) and carbon black, and comprise 35 phr of plasticizers with/without a dimethyl silicone oil (KF96F-50cs from Shin-Etsu Chemical Co., Ltd.) or a type mercapto-modified silicone oil (X-22-167B from Shin-Etsu Chemical Co., Ltd.), additionally with/without zinc oxide:

Composition C-1: composition without silicone oil (a reference) and with zinc oxide;

Composition C-2: composition with 10 phr of the dimethyl silicone oil and with zinc oxide (a comparative example);

Composition C-3: composition with 15 phr of the dimethyl silicone oil and with zinc oxide (another comparative example);

Composition C-4: composition according to the present invention with 10 phr of the type mercapto-modified silicone oil and with zinc oxide;

Composition C-5: composition according to the present invention with 15 phr of the type mercapto-modified silicone oil and with zinc oxide;

Composition C-6: composition according to the present invention with 10 phr of the type mercapto-modified silicone oil without zinc oxide;

Composition C-7: composition according to the present invention with 15 phr of the type mercapto-modified silicone oil without zinc oxide.

The formulations of the seven compositions (Table 1—contents of the various products expressed in phr) and their properties after curing (40 min at 150° C.) are given in Tables 1 and 2; the vulcanization system is composed of sulphur and sulphenamide.

The examination of the results in Table 2 shows that each of the compositions according to the present invention C-4, C-5, C-6 and C-7, compared with the reference C-1 and the comparative examples C-2 and C-3, exhibits a markedly improved (that is reduced) hysteresis, as is shown by a very substantially reduced value for $\tan(\delta)_{max}$, which is the recognized indicator of a reduction in the rolling resistance of tires and consequently in the energy consumption of the motor vehicles equipped with such tires.

It is subsequently noted that the compositions C-4, C-5, C-6 and C-7, still compared with the reference C-1 and the comparative examples C-2 and C-3, reveals the highest values for modulus under strong strain (M100 and M300) and for index of reinforcement (M300/M100 ratio), a clear indicator to a person skilled in the art of an excellent ability to withstand wear.

6-2-2. Example 2

In this test, six compositions (identified as C-8, C-9, C-10, C-11, C-12 and C-13) based on a diene elastomer (SBR) are compared, the six compositions are reinforced with silica (as a reinforcing inorganic filler), and comprise 40 phr of plasticizers with/without a silanol-modified silicone oil (KF-9701 from Shin-Etsu Chemical Co., Ltd.) or the mercapto-modified silicone oil (X-22-167B from Shin-Etsu Chemical Co., Ltd.):

Composition C-8: composition without silicone oil (a reference);

Composition C-9: composition with 10 phr of the silanol-modified silicone oil (a comparative example);

Composition C-10: composition with 3 phr of the mercapto-modified silicone oil (another comparative example);

Composition C-11: composition according to the present invention with 5 phr of the mercapto-modified silicone oil;

Composition C-12: composition according to the present invention with 10 phr of the mercapto-modified silicone oil;

Composition C-13: composition according to the present invention with 15 phr of the mercapto-modified silicone oil;

The formulations of the six compositions (Table 3—contents of the various products expressed in phr) and their properties after curing (40 min at 150° C.) are given in Tables 3 and 4; the vulcanization system is composed of sulphur and sulphenamide.

The examination of the results in Table 4 shows that each of the compositions according to the present invention C-11, C-12 and C-13 exhibits a significant and unexpected reduction in hysteresis, seen through the $\tan(\delta)_{max}$ value in comparison with the reference C-8, the comparative examples C-9 and C-10.

It should be noted that each of the compositions C-11, C-12 and C-13 compared with the reference C-8 reveals a markedly high values for M100, M300 and M300/M100 ratio, a clear indicator to a person skilled in the art of an excellent ability to withstand wear.

In this test, two compositions (identified as C-14 and C-15) based on a diene elastomer (SBR) are compared, the two compositions are reinforced with carbon black, but without silica (as inorganic filler), and comprise 40 phr of plasticizers with/without the type mercapto-modified silicone oil (X-22-167B from Shin-Etsu Chemical Co., Ltd.):

Composition C-14: composition without the mercapto-modified silicone oil (a reference);

Composition C-15: composition with 10 phr of the mercapto-modified silicone oil (a comparative example).

The formulations of the two compositions (Table 5-contents of the various products expressed in phr) and their properties after curing (40 min at 150° C.) are given in Tables 5 and 6; the vulcanization system is composed of sulphur and sulphenamide.

The examination of the results in Table 6 shows that in the compositions reinforced with carbon black only compared with that of another composition reinforced with silica (as inorganic filler) exhibited in Tables 2 and 4 for Examples 1 and 2, there is few effect of this mercapto-modified silicone oil incorporation to $\tan(\delta)_{max}$ (relative to rolling resistance of the tires) and M100, M300 and M300/M100 ratio (related to wear resistance of the tires).

In conclusion, the results of the tests commented above show that the rubber composition in accordance with the present invention, comprising in particular a high level of inorganic filler and a prescribed amount of mercapto-modified silicone oil, makes it possible to improve rolling resistance and wear resistance of the tires.

TABLE 1

| Rubber | Ref. 1 | Comparative examples | | Examples of the invention | | | |
|---|---|---|---|---|---|---|---|
| Composition No.: | C-1 | C-2 | C-3 | C-4 | C-5 | C-6 | C-7 |
| BR (1) | 25 | 25 | 25 | 25 | 25 | 25 | 25 |
| SBR (2) | 75 | 75 | 75 | 75 | 75 | 75 | 75 |
| Silica (3) | 80 | 80 | 80 | 80 | 80 | 80 | 80 |
| Coupling agent (4) | 6.4 | 6.4 | 6.4 | 6.4 | 6.4 | 6.4 | 6.4 |
| Carbon black (5) | 4 | 4 | 4 | 4 | 4 | 4 | 4 |
| Non aromatic oil (6) | 15 | 10 | 10 | 10 | 10 | 10 | 10 |
| Hydrocarbon resin (7) | 20 | 15 | 10 | 15 | 10 | 15 | 10 |
| Dimethyl silicone oil (8) | | 10 | 15 | | | | |
| Mercapto-modified silicone oil (9) | | | | 10 | 15 | 10 | 15 |
| ZnO | 1 | 1 | 1 | 1 | 1 | | |
| Stearic acid | 2 | 2 | 2 | 2 | 2 | 2 | 2 |
| Antiozone wax | 1.5 | 1.5 | 1.5 | 1.5 | 1.5 | 1.5 | 1.5 |
| Antioxidant (10) | 1.9 | 1.9 | 1.9 | 1.9 | 1.9 | 1.9 | 1.9 |
| DPG (11) | 1.5 | 1.5 | 1.5 | 1.5 | 1.5 | 1.5 | 1.5 |

TABLE 1-continued

| Rubber Composition No.: | Ref. 1 C-1 | Comparative examples C-2 | C-3 | Examples of the invention C-4 | C-5 | C-6 | C-7 |
|---|---|---|---|---|---|---|---|
| Sulphur | 1.2 | 1.2 | 1.2 | 1.2 | 1.2 | 1.2 | 1.2 |
| Accelerator (12) | 1.9 | 1.9 | 1.9 | 1.9 | 1.9 | 1.9 | 1.9 |

(1) BR with 0.3% of 1,2 vinyl; 2.7% of trans; 97% of cis-1,4 (Tg = −105° C.);
(2) SBR with 26% of styrene, 74% of butadiene (21% of-1,4 trans, 21% of-1,4 cis and 58% of-1,2) (Tg = −25° C.);
(3) Silica "Zeosil 1165MP" from Rhodia;
(4) Coupling agent TESPT ("Si69" from Evonik);
(5) Grade ASTM N234 (Cabot);
(6) MES oil ("Catenex SNR" from Shell)
(7) Hydrocarbon resin C5/C9 type ("Escorez ECR 373" from Exxon)
(8) Silicone fluid with dimethylpolysiloxane ("KF96-50cs" from Shin-Etsu Chemical Co., Ltd.);
(9) α, ω difunctional (Dual-end) type mercapto-modified silicone fluids ("X-22-167B" from Shin-Etsu Chemical Co., Ltd.);
(10) N-(1,3-dimethylbutyl)-N-phenyl-para-phenylenediamine ("Santoflex 6-PPD" from Flexsys);
(11) Diphenylguanidine ("Perkacit DPG" from Flexsys);
(12) N-dicyclohexyl-2-benzothiazolesulphenamide ("Santocure CBS" from Flexsys).

TABLE 2

| Rubber Composition No.: | Ref. 1 C-1 | Comparative examples C-2 | C-3 | Examples of the invention C-4 | C-5 | C-6 | C-7 |
|---|---|---|---|---|---|---|---|
| Shore A | 66 | 70 | 71 | 70 | 69 | 67 | 67 |
| M10 (MPa) | 5.5 | 6.5 | 6.7 | 6.3 | 6.4 | 5.7 | 5.7 |
| M100 (MPa) | 2.0 | 2.2 | 2.2 | 2.7 | 2.7 | 2.4 | 2.4 |
| M300 (MPa) | 2.3 | 2.6 | 2.6 | 3.5 | 3.5 | 3.4 | 3.3 |
| M300/M100 | 1.15 | 1.18 | 1.18 | 1.30 | 1.30 | 1.42 | 1.38 |
| Tan (δ)$_{max}$ at 23° C. | 0.34 | 0.34 | 0.34 | 0.31 | 0.27 | 0.29 | 0.26 |

TABLE 3

| Rubber Composition No.: | Ref. 2 C-8 | Comparative examples C-9 | Examples of the invention C-10 | C-11 | C-12 | C-13 |
|---|---|---|---|---|---|---|
| SBR (2) | 100 | 100 | 100 | 100 | 100 | 100 |
| Silica (3) | 90 | 90 | 90 | 90 | 90 | 90 |
| Coupling agent (4) | 7.2 | 7.2 | 7.2 | 7.2 | 7.2 | 7.2 |
| Non aromatic oil (6) | 40 | 30 | 37 | 35 | 30 | 25 |
| Silanol-modified silicone oil (13) | | 10 | | | | |
| Mercapto-modified silicone oil (9) | | | 3 | 5 | 10 | 15 |
| ZnO | 1 | 1 | 1 | 1 | 1 | 1 |
| Stearic acid | 2 | 2 | 2 | 2 | 2 | 2 |
| Antiozone wax | 1.5 | 1.5 | 1.5 | 1.5 | 1.5 | 1.5 |
| Antioxidant (10) | 1.9 | 1.9 | 1.9 | 1.9 | 1.9 | 1.9 |
| DPG (11) | 1.7 | 1.7 | 1.7 | 1.7 | 1.7 | 1.7 |
| Sulphur | 1.2 | 1.2 | 1.2 | 1.2 | 1.2 | 1.2 |
| Accelerator (12) | 1.9 | 1.9 | 1.9 | 1.9 | 1.9 | 1.9 |

(13) α, ω difunctional (Dual-end) type silanol silicone oil (silicone fluids) ("KF-9701" from Shin-Etsu Chemical Co., Ltd);

TABLE 4

| Rubber Composition No.: | Ref. 2 C-8 | Comparative examples C-9 | Examples of the invention C-10 | C-11 | C-12 | C-13 |
|---|---|---|---|---|---|---|
| Shore A | 64 | 74 | 68 | 68 | 67 | 68 |
| M10 (MPa) | 4.6 | 7.7 | 5.2 | 5.3 | 5.3 | 5.5 |
| M100 (MPa) | 2.1 | 3.5 | 2.7 | 2.8 | 2.7 | 2.5 |
| M300 (MPa) | 2.3 | 3.3 | 3.1 | 3.2 | 3.2 | 3.2 |
| M300/M100 | 1.10 | 0.94 | 1.15 | 1.14 | 1.19 | 1.23 |
| Tan (δ)$_{max}$ at 23° C. | 0.33 | 0.32 | 0.32 | 0.29 | 0.26 | 0.26 |

TABLE 5

| | Rubber Composition No.: | |
|---|---|---|
| | Reference 3 C-14 | Comparative example C-15 |
| SBR (2) | 100 | 100 |
| Carbon black (14) | 80 | 80 |
| Non aromatic oil (6) | 40 | 30 |
| Mercapto-modified silicone oil (9) | | 10 |
| ZnO | 1 | 1 |
| Stearic acid | 2 | 2 |
| Antiozone wax | 1.5 | 1.5 |
| Antioxidant (10) | 1.0 | 1.0 |
| Sulphur | 1.2 | 1.2 |
| Accelerator (12) | 1.9 | 1.9 |

(14) Grade ASTM N375 (Cabot);

TABLE 6

| | Rubber Composition No.: | |
|---|---|---|
| | Reference 3 C-14 | Comparative example C-15 |
| Shore A | 56 | 57 |
| M10 (MPa) | 3.3 | 3.5 |
| M100 (MPa) | 1.5 | 1.5 |
| M300 (MPa) | 2.1 | 2.2 |
| M300/M100 | 1.40 | 1.47 |
| Tan (δ)$_{max}$ at 23° C. | 0.42 | 0.40 |

The invention claimed is:

1. A tread for a pneumatic tire comprising a rubber composition comprising at least:
   a diene elastomer;
   at least 60 phr of silica;
   20 to 100 phr of a plasticizer comprising more than 4 phr of a mercapto-modified silicone oil; and
   0.2 and 20 phr of carbon black,
   wherein the diene elastomer is chosen from the group consisting of natural rubber, synthetic polyisoprenes, polybutadienes, butadiene copolymers, isoprene copolymers and mixtures thereof, and
   wherein the plasticizer further comprises a compound selected from the group consisting of hydrocarbon resins, liquid plasticizers other than the mercapto-modified silicone oil, and mixtures thereof.

2. The tread for a pneumatic tire according to claim 1, wherein the content of the mercapto-modified silicone oil is from 5 to 35 phr.

3. The tread for a pneumatic tire according to claim 1, wherein the mercapto-modified silicone oil bears at least two mercapto functions per molecule.

4. The tread for a pneumatic tire according to claim 1, wherein the functional type of the mercapto-modified silicone oil is a α, ω difunctional type.

5. The tread for a pneumatic tire according to claim 1, wherein the content of the silica is more than 70 phr and less than 120 phr.

6. The tread for a pneumatic tire according to claim 1, wherein the liquid plasticizers are selected from the group consisting of polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and mixtures thereof.

7. The tread for a pneumatic tire according to claim 1, wherein the hydrocarbon resins are selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, alpha-methyl styrene homopolymer or copolymer resins, and mixtures thereof.

8. The tread for a pneumatic tire according to claim 1, wherein the content of the plasticizer is from 20 to 80 phr.

9. A process of manufacturing the tread for a pneumatic tire according to claim 1 comprising at least the steps of:
incorporating, into a mixer, at least the diene elastomer and at least 60 phr of silica, during a first stage, kneading thermomechanically until a maximum temperature of between 130° C. and 200° C. is reached to obtain a combined mixture;
cooling the combined mixture to a temperature of less than less than 100° C.;
subsequently incorporating, during a second stage, a crosslinking system;
kneading the combined mixture including the crosslinking system up to a maximum temperature of less than 120° C. to obtain a rubber composition; and
extruding or calendering the rubber composition,
wherein the plasticizer comprising the mercapto-modified silicone oil is incorporated either during the first stage or during the second stage, or during both of the first and second stages so that the total weight of the plasticizer is from 20 to 100 phr and the mercapto-modified silicone oil is more than 4 phr.

10. The process according to claim 9, wherein the mercapto-modified silicone oil is incorporated partially or totally during the second stage.

11. The process according to claim 9, wherein the crosslinking system comprises less than 2 phr of zinc oxide.

12. The process according to claim 11, wherein the crosslinking system is devoid of zinc oxide.

13. A pneumatic tire comprising the tread according to claim 1.

* * * * *